United States Patent
Chen et al.

(10) Patent No.: US 6,845,415 B2
(45) Date of Patent: Jan. 18, 2005

(54) COMPUTING SYSTEM CAPABLE OF CONTROLLING DISK LOADING AND DISK UNLOADING OPERATIONS OF AN OPTICAL DISK DRIVE

(75) Inventors: Chao-Yu Chen, Chung-Ho (TW); Simon Fang, Chung-Ho (TW); Hen-Yu Neo, Chung-Ho (TW)

(73) Assignee: Micro-Star Int'l Co., Ltd., Chung-Ho (TW)

( * ) Notice: Subject to any disclaimer, the term of this patent is extended or adjusted under 35 U.S.C. 154(b) by 76 days.

(21) Appl. No.: 10/443,253

(22) Filed: May 22, 2003

(65) Prior Publication Data

US 2004/0236870 A1 Nov. 25, 2004

(51) Int. Cl.[7] ............................................... G06F 13/00
(52) U.S. Cl. ................... 710/72; 710/15; 369/13.21; 369/30.94; 369/44.11; 360/99.02; 360/99.06
(58) Field of Search ................................ 710/72, 15–19, 710/62; 369/13.21, 30.94, 44.11; 360/99.02, 99.06

(56) References Cited

U.S. PATENT DOCUMENTS

| 5,930,141 A | * | 7/1999 | Kamiyama et al. | .......... 700/159 |
| 6,643,209 B2 | * | 11/2003 | Caulkins | ...................... 365/228 |
| 6,742,140 B2 | * | 5/2004 | Caulkins | ...................... 714/24 |

* cited by examiner

Primary Examiner—Christopher Shin
(74) Attorney, Agent, or Firm—Winston Hsu

(57) ABSTRACT

A computing system is adapted for use with an optical disk drive, and includes a motherboard and a control key. The motherboard is adapted to be coupled electrically to the optical disk drive. The control key is coupled electrically to the motherboard, and is operable so as to provide a control signal to the motherboard. The motherboard is adapted to control disk loading and disk unloading operations of the optical disk drive in accordance with the control signal provided by the control key.

3 Claims, 2 Drawing Sheets

COMPUTING SYSTEM CAPABLE OF CONTROLLING DISK LOADING AND DISK UNLOADING OPERATIONS OF AN OPTICAL DISK DRIVE

BACKGROUND OF THE INVENTION

1. Field of the Invention

The invention relates to the control of an optical disk drive, more particularly to a computing system capable of controlling disk loading and disk unloading operations of an optical disk drive through a control key of the computing system.

2. Description of the Related Art

A conventional method for controlling disk loading and unloading operations of an optical disk drive that is mounted in a computer housing involves pressing of a disk loading/unloading button found on a control panel of the optical disk drive. When the disk loading/unloading button is pressed, a control circuit in the optical disk drive will first detect whether the optical disk drive is currently in a disk loading or disk unloading state before executing the requested disk loading or disk unloading operation. To permit operation of the disk loading/unloading button, the control panel of the optical disk drive should be accessible from the exterior of the computer housing. However, when the control panel of the optical disk drive is exposed, an adverse affect on the appearance of the computer housing results. As a remedy, some computer housings are provided with a movable cover plate to cover the control panel of the optical disk drive so as to improve the overall appearance of the computer housing. However, due to the presence of the cover plate, when a disk loading or disk unloading operation is to be performed, the cover plate must first be moved to an uncovering position to permit access to the disk loading/unloading button on the control panel of the optical disk drive, which arises in some inconvenience to computer users.

Moreover, apart from the aforesaid hardware control method, there is also available a software control method using a Windows operating system of a computer, wherein the Windows operating system will first detect whether the optical disk drive is currently in a disk loading or disk unloading state before executing the requested disk loading or disk unloading operation. However, in the conventional software control method, the Windows operating system must execute a series of complicated commands for detection and decision operations with the support of relevant drivers in order to accomplish the requisite disk drive control. The response time involved is relatively long, and the software control method is not available in other operating systems, such as DOS.

SUMMARY OF THE INVENTION

Therefore, the object of the present invention is to provide a computing system that dispenses with the need to operate a disk loading/unloading button on a control panel of an optical disk drive for controlling disk loading and disk unloading operations of the optical disk drive and that does not involve the use of a Windows operating system to perform such control, thereby overcoming the aforesaid drawbacks associated with the prior art.

Accordingly, the computing system of this invention is adapted for use with an optical disk drive, and comprises a motherboard adapted to be coupled electrically to the optical disk drive, and a control key coupled electrically to the motherboard and operable so as to provide a control signal to the motherboard. The motherboard is adapted to control disk loading and disk unloading operations of the optical disk drive in accordance with the control signal provided by the control key.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
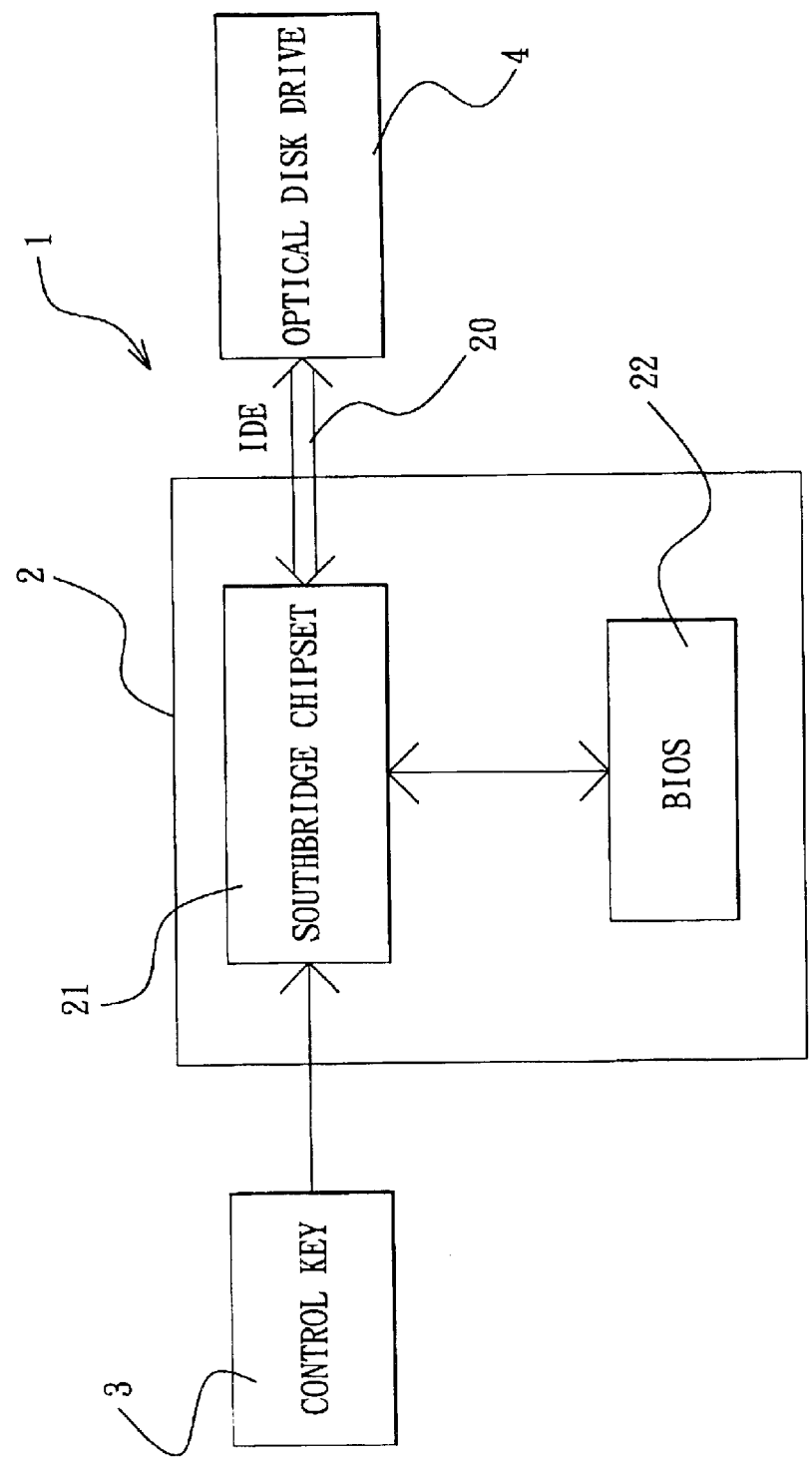
FIG. 1 is a schematic circuit block diagram of the first preferred embodiment of a computing system according to the present invention.

Before the present invention is described in greater detail with reference to the accompanying embodiments, it should be noted herein that like elements are denoted by the same reference numerals throughout the disclosure.

Referring to FIG. 1, the first preferred embodiment of a computing system 1 according to the present invention is shown to be adapted for use with an optical disk drive 4 that is mounted in a housing (not shown) of the computing system 1. The computing system 1 includes a motherboard 2 and a control key 3.

The motherboard 2, which is contained in the housing (not shown) of the computing system 1, is responsible for establishing connections among a central processing unit (CPU), a memory, a video adaptor card, peripheral interface circuits, etc., and is coupled electrically to the optical disk drive 4 such that control of disk loading, disk unloading and disk playing operations of the optical disk drive 4 is possible through the motherboard 2. In this embodiment, the optical disk drive 4 is coupled electrically to a Southbridge chipset 21, which is responsible for managing peripheral devices, on the motherboard 2 through an Integrated Drive Electronics (IDE) interface 20. As described in the foregoing, the optical disk drive 4 has a control panel (not shown) provided with a disk loading/unloading button (not shown). To improve the overall appearance of the housing (not shown) installed with the optical disk drive 4, the housing (not shown) may be provided with a movable cover plate (not shown) to conceal the control panel (not shown) of the optical disk drive 4.

The control key 3 is mounted on the housing (not shown) of the computing system 1 (such as a desktop personal computer) so as to be accessible from the exterior of the housing (not shown), and is coupled electrically to the Southbridge chipset 21. As shown in FIG. 1, when the control key 3 is pressed, a control signal will be provided by the control key 3 to the Southbridge chipset 21 so as to drive a General Purpose I/O (GPI/O) of the Southbridge chipset 21 to issue a System Management Interrupt (SMI) signal to the CPU (not shown) and a basic input/output system (BIOS) 22 of the motherboard 2. The BIOS 22 is thus requested to issue sequential load and unload Advanced Technology Attachment Packet Interface (ATAPI) commands that are received by the optical disk drive 4 through the Southbridge chipset 21 and the IDE interface 20, thereby enabling the optical disk drive 4 to perform one of the following operations:

1. When the optical disk drive 4 is currently in a disk loading state, the load command will be ignored by the optical disk drive 4, whereas the unload command that follows the load command will be executed so that the disk unloading operation will be performed by the optical disk drive 4 accordingly.
2. When the optical disk drive 4 is currently in a disk unloading state, the load command will be executed so that the disk loading operation will be performed by the optical disk drive 4 accordingly. The unload command that follows the load command will be ignored by the optical disk drive 4.

In sum, when the control key 3 is pressed, a control signal will be provided by the control key 3 to the Southbridge chipset 21, which responds by requesting the BIOS 22 to issue sequential load and unload commands that are to be provided to the optical disk drive 4 through the Southbridge chipset 21 and the IDE interface 20. Therefore, without the involvement of a Windows operating system for detection and decision operations, and without operating the disk loading/unloading button (not shown) on the control panel (not shown) of the optical disk drive 4, the optical disk drive 4 can be controlled to perform the disk loading operation when the optical disk drive 4 is in a disk unloading state, and to perform the disk unloading operation when the optical disk drive 4 is in a disk loading state.

Figure 2:
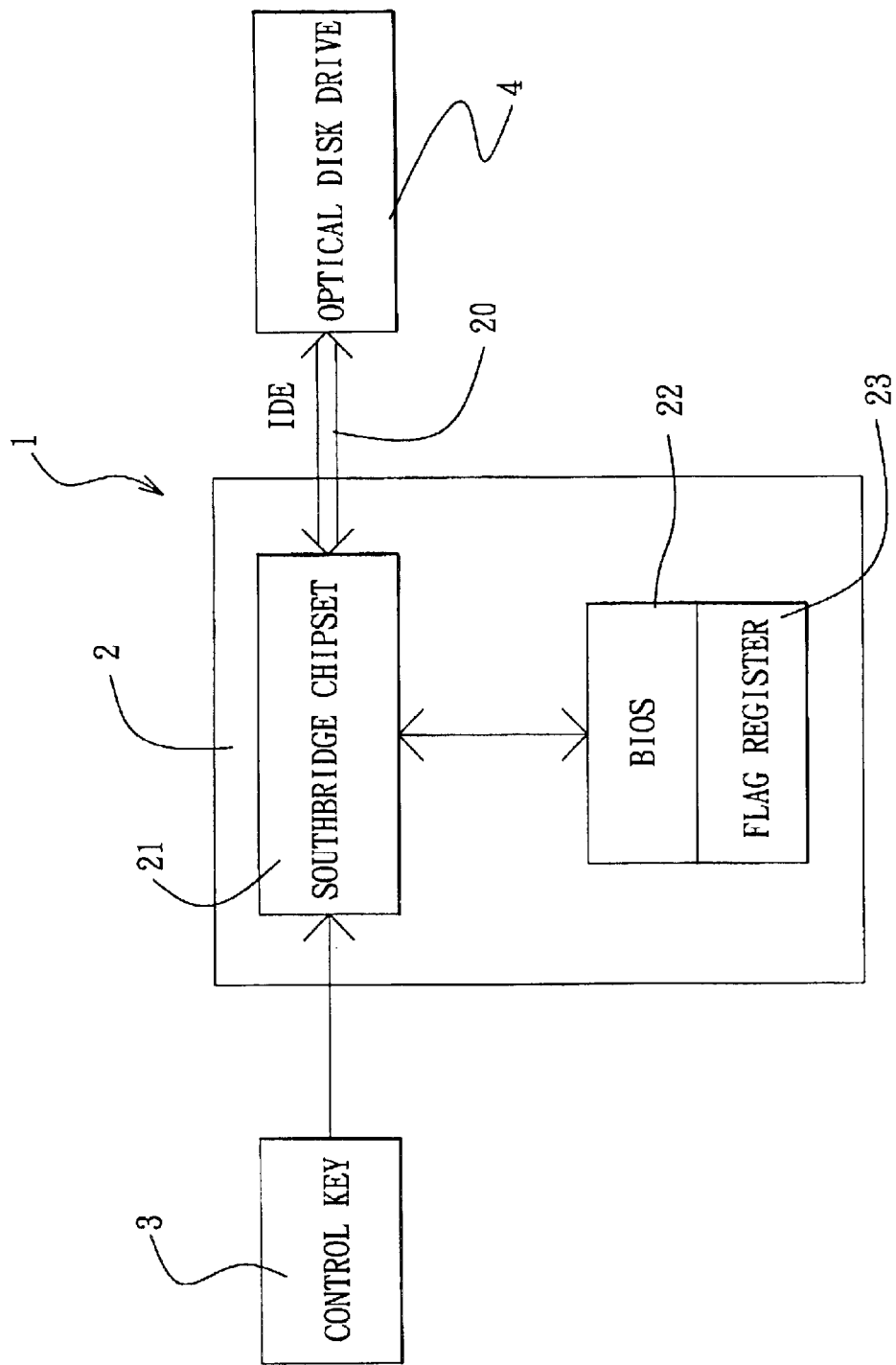
FIG. 2 is a schematic circuit block diagram of the second preferred embodiment of a computing system according to the present invention.

Referring to FIG. 2, the second preferred embodiment of a computing system 1 according to the present invention differs from the first preferred embodiment in that: the BIOS 22 is provided with a flag register 23 for indicating whether the optical disk drive 4 is in a disk loading state or a disk unloading state. For instance, when the optical disk drive 4 is in a disk loading state, the BIOS 22 will set the content of the flag register 23 to 0, and when the optical disk drive 4 is in a disk unloading state, the BIOS 22 will set the content of the flag register 23 to 1. In general, when the computing system 1 is turned on, the optical disk drive 4 is assumed to be in the disk loading state, and the initial flag value is thus set to 0.

In the second preferred embodiment, when the control key 3 is pressed, a control signal will be provided by the control key 3 to the Southbridge chipset 21, which responds by issuing the aforesaid SMI signal to the BIOS 22. The BIOS 22 then updates the content of the flag register 23 and issues the load or unload command according to the content of the flag register 23. For instance, when the content of the flag register 23 indicates a current disk loading state of the optical disk drive 4, in response to the SMI signal from the Southbridge chipset 21, the BIOS 22 will update the content of the flag register 23 to indicate the disk unloading state, and will then issue the unload command that is to be provided to the optical disk drive 4 through the Southbridge chipset 21 and the IDE interface 20, thereby enabling the optical disk drive 4 to perform a disk unloading operation. In the same manner, when the content of the flag register 23 indicates a current disk unloading state of the optical disk drive 4, receipt of the SMI signal from the Southbridge chipset 21 will enable the BIOS 22 to update the content of the flag register 23 so as to indicate the disk loading state, and to issue the load command that is to be provided to the optical disk drive 4 through the Southbridge chipset 21 and the IDE interface 20, thereby enabling the optical disk drive 4 to perform a disk loading operation.

Therefore, in the second preferred embodiment of this invention, because the current disk loading or disk unloading state of the optical disk drive 4 is recorded in the flag register 23 of the BIOS 22, pressing of the control key 3 will enable the BIOS 22 to generate the required load or unload command for controlling the disk loading and disk unloading operations of the optical disk drive 4 accordingly.

In the computing system 1 of this invention, because load and unload commands can be issued to the optical disk drive 4 without the involvement of a Windows operating system for detection and decision operations, a shorter response time is possible. Moreover, because the control key 3 is not provided on the control panel of the optical disk drive 4, control of the disk loading and disk unloading operations of the optical disk drive 4 can be conveniently performed even when the control panel is concealed by a movable cover plate of the housing of the computing system 1. In addition, control of the disk loading and disk unloading operations of the optical disk drive 4 is possible in the computing system 1 of this invention even when the DOS operating system is in use.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A computing system adapted for use with an optical disk drive, said computing system comprising:

a motherboard adapted to be coupled electrically to the optical disk drive; and a control key coupled electrically to said motherboard and operable so as to provide a control signal to said motherboard, said motherboard being adapted to control disk loading and disk unloading operations of the optical disk drive in accordance with the control signal provided by said control key.

2. The computing system of claim 1, wherein said motherboard includes a Southbridge chipset and a basic input/output system (BIOS), the control signal being provided to said Southbridge chipset, in response to the control signal, said Southbridge chipset requesting said BIOS to issue sequential load and unload commands that are to be provided to the optical disk drive, thereby enabling the optical disk drive to perform the disk loading operation when the optical disk drive is in a disk unloading state, and to perform the disk unloading operation when the optical disk drive is in a disk loading state.

3. The computing system of claim 1, wherein said motherboard includes a Southbridge chipset and a basic input/output system (BIOS), said BIOS being provided with a flag register for indicating whether the optical disk drive is in a disk loading state or a disk unloading state, the control signal being provided to said Southbridge chipset, in response to the control signal, said Southbridge chipset enabling said BIOS to update content of said flag register and to issue one of a load command, that is to be provided to the optical disk drive so as to enable the optical disk drive to perform the disk loading operation, and an unload command, that is to be provided to the optical disk drive so as to enable the optical disk drive to perform the disk unloading operation, in accordance with the content of said flag register.

* * * * *